United States Patent [19]

Sassak

[11] 4,426,761
[45] Jan. 24, 1984

[54] PIPE CLAMP AND METHOD OF CLAMPING

[75] Inventor: Frank Sassak, Riverview, Mich.

[73] Assignee: McInerney Spring and Wire Company, Grand Rapids, Mich.

[21] Appl. No.: 265,901

[22] Filed: May 21, 1981

[51] Int. Cl.³ .................. B23P 11/02; B21D 39/00; F16B 4/00; F16L 19/08
[52] U.S. Cl. ........................................ 29/447; 29/508; 29/516; 29/283.5; 285/381; 285/382.2; 285/382.7; 403/273; 403/278; 403/285
[58] Field of Search ............... 285/381, 382.2, 382.7, 285/411; 403/273, 278, 279, 285, 377, 281; 29/508, 447, 282, 283.5, DIG. 35

[56] References Cited

U.S. PATENT DOCUMENTS

| 418,752 | 1/1890 | Rogers . | |
|---|---|---|---|
| 858,463 | 7/1907 | Matchette et al. | 285/411 X |
| 1,249,743 | 12/1917 | Gradl . | |
| 1,678,640 | 7/1928 | Hall | 285/382.2 |
| 2,209,181 | 7/1940 | Wendel | 285/382.2 X |
| 2,241,042 | 6/1941 | Scarritt . | |
| 2,449,795 | 9/1948 | Stillwagon | 403/281 X |
| 3,109,215 | 11/1963 | Brown | 285/382.2 X |
| 3,900,933 | 8/1975 | Engman et al. | 285/382.2 X |
| 4,147,384 | 4/1979 | Heckethorn . | |
| 4,226,449 | 10/1980 | Cole | 285/382.2 |
| 4,281,863 | 8/1981 | Hall . | |

FOREIGN PATENT DOCUMENTS 25393 1/1934 Fed. Rep. of Germany .

Primary Examiner—Richard J. Scanlan, Jr.
Attorney, Agent, or Firm—Cullen, Sloman, Cantor, Grauer, Scott & Rutherford

[57] ABSTRACT

A pipe clamp for securing together the annular overlap of a pair of assembled and engaging pipes comprises a ring body snugly and concentrically overlying said pipes and contracted or swaged thereon. The ring body is mechanically interlocked with the outer pipe and the pipes are mechanically interlocked and annularly interconnected and sealed throughout 360°. The method of interlocking and sealing together a pair of telescoped pipes includes assembling a ring body around the pipes at their overlap and annularly contracting or swaging the ring body onto the outer pipe. The ring body deforms both pipes forming concentric annular channels therein and a bead in the outer pipe nested within the channel of the inner pipe, the ring body being mechanically interlocked with the outer pipe.

7 Claims, 8 Drawing Figures

PIPE CLAMP AND METHOD OF CLAMPING

BACKGROUND OF THE INVENTION

Heretofore in connection with a pair of telescoped engaging pipes, such as the outlet of a muffler and the corresponding exhaust pipe of a vehicle, though not limited thereto, there has long existed the problem of effectively securing the pipes together at their overlap and at the same time providing a seal between the assembled pipes and for securing the clamp to the outer pipe.

Various types of clamp assemblies have been employed to interconnect the pipes at their overlap. The difficulty with current pipe clamps is that they do not provide an effective mechanical interlock between the pipes and they do not provide an efficient seal between the pipes preventing the escape of exhaust gases to atmosphere, nor a positive interlock between the clamp and the pipes.

Heretofore in the telescoping assembly of the outlet of a muffler or a catalytic converter and the corresponding engaging exhaust pipe of a vehicle, the clamp consisted of a pair of non-symmetrical parts, which at most provide a friction interlock between the overlapped pipes and usually require the drawing up and tightening of clamp parts by bolts and nuts. Heretofore clamps of this type requiring fasteners, due to vibration or movement, the nuts eventually become loosened and the clamp rendered ineffective.

SUMMARY OF THE INVENTION

An important feature of the present invention is to provide a pipe clamp for securing together the annular overlap of a pair of assembled engaging inner and outer pipes using a ring body which concentrically overlies the pipes at their overlap and its shrunk or swaged thereon. It is a further feature to provide a unit ring body by which due to a shrinking or swaging thereof forms concentric outer channels in the pipes and a corresponding inner annular bead in the outer pipe nested within the channel upon the inner pipe for providing an annular mechanical interlock and seal between the pipes throughout 360° and a mechanical interlock between the ring body and the outer pipe.

A further feature is the provision of a ring body whose internal diameter has been expanded by the application of heat thereto which upon cooling concentrically contracts so as to form a mechanical interlock between the ring body and pipes and at the same time a mechanical interlock and seal between the inner and outer pipes by the formation therein for annular channels and bead.

It is a further feature to provide a novel method of clamping together a pair of telescoped engaging pipes to provide a mechanical interlock between the pipes as well as an annular seal throughout 360° and at the same time provide a mechanical interlock between the clamp body and the pipes.

It is a further feature of providing in conjunction with a pair of assembled telescoped pipes with a ring body positionable over the pipes wherein its internal diameter has been reduced after assembly thereon either by shrinking or swaged so as to provide a mechanical interlock between the pipes, an annular seal between the pipes and a mechanical interlock between the ring body and the pipes.

A further feature of the present invention includes in the method for contracting the ring body by the use of a pair pivotally interconnected dies having grooved semi-circular opposed channels therein adapted to receive the ring body together with a means for drawing the dies together for shrinking the ring body onto the pipes at their overlap for mechanically interlocking and sealing the pipes together throughout 360° and for mechanically interlocking the ring body with the pipes.

These and other objects and features will be seen from the following specification and claims in conjunction with the appended drawing.

THE DRAWING

It will be understood that the above drawing illustrates merely an embodiment of the invention and one form of apparatus of accomplishing the method of the present invention and that other embodiments or apparatus are contemplated within the scope of the claims hereafter set forth.

DETAILED DESCRIPTION OF AN EMBODIMENT OF THE PIPE CLAMP AND METHOD

Figure 1:
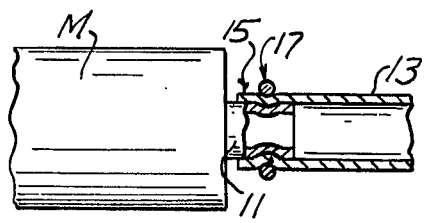
FIG. 1 is a fragmentary schematic view of a vehicle muffler having an outlet pipe to which an exhaust pipe of a vehicle is clamped, as fragmentarily shown.

Referring to the drawing, a muffler M, fragmentarily shown in FIG. 1, includes an outlet pipe 11 over which is telescoped an exhaust or other pipe 13 of a vehicle in engaging relation and defining between the two pipes the overlap 15. While the drawing illustrates the connection of the outlet pipe of a muffler to the exhaust pipe of a vehicle, the present invention is not limited thereto, but is more broadly directed to the clamping of a pair of telescoped engaging pipes at their overlap.

Figure 2:
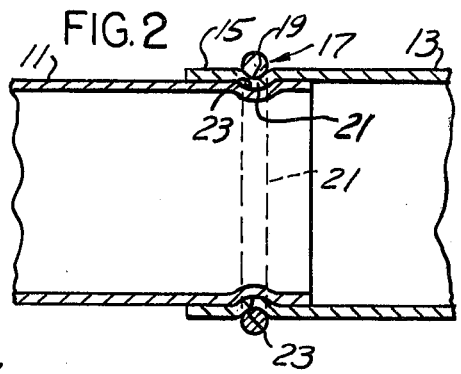
FIG. 2 is a longitudinal section on an increased scale showing the clamping of the pipes using the present pipe clamp to illustrate shrinking of the ring for forming concentric channels and an annular bead within the pipes.
Figure 3:
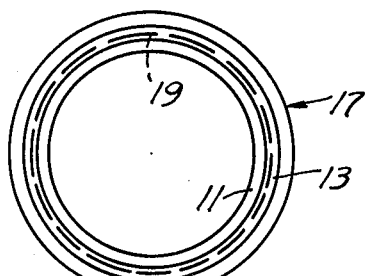
FIG. 3 is an end view thereof.

Referring particularly to FIGS. 1, 2 and 3, the present pipe clamp is in the form of a ring body 17 made of steel, as for example 1010–1020 steel, though not limited thereto which is positioned around the assembled pipes 11, 13 at their overlap 15 and shrunk or compressed radially inward or otherwise swaged onto the assembled pipes.

Figure 6:
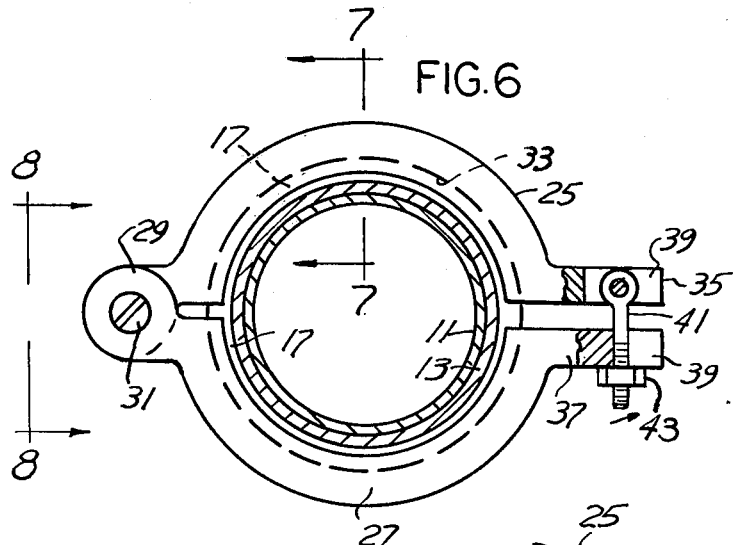
FIG. 6 is an end elevational view of an illustrative set of dies for shrinking the clamp body onto the assembled pipes at their overlap.

Various means may be employed for shrinking the ring body 17 onto the assembled pipes such as by swaging or shrinking by utilizing a highly heated ring which cools and contracts upon returning to room temperature, or by the use of contracting dies, FIG. 6.

Figure 4:
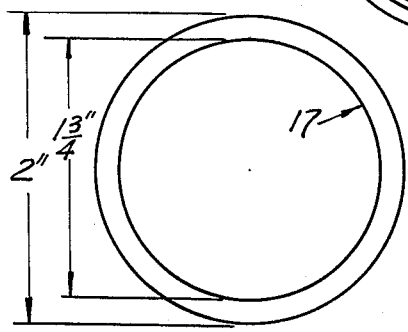
FIG. 4 is an end view of the clamp ring as it would be assembled over the pipes at their overlap.
Figure 5:
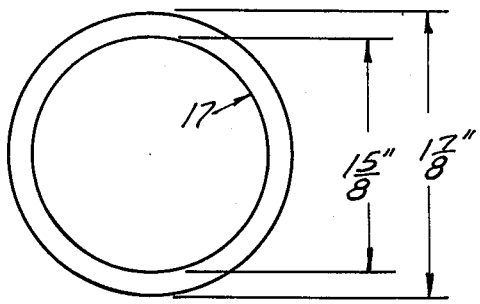
FIG. 5 is a similar view showing the ring whose internal and outside diameters have been reduced in the shrinking of the pipe clamp body onto the assembled pipes as shown in FIG. 2.

However the ring may be contracted utilizing the dies or other means, the contracted ring body 17 is initially employed has the illustrative inner and outer diameters shown in FIG. 4 as being approximately 1 and three fourth inches and two inches respectively. The contracted or swaged ring illustratively shown in FIG. 5 with both dimensions slightly reduced, the I.D. being one and five eighths inches and the outside diameter one and seven eighths inches, only for illustration.

In order to clamp the ring body, it is only necessary that the respective inner diameter of the ring be reduced after its positioning around the overlap 15 of the assembled pipes 11 and 13, FIGS. 2 and 3. Such shrinking or swaging of the ring 17 and reducing its interior diameter to some extent forms an annular channel 19 in the outer pipe 13, a corresponding bead 21 upon the interior of the outer pipe 13 and a corresponding concentric outer annular channel 23 upon the interior pipe 11.

There is provided a mechanical interlock of the pipes at their overlap by the positioning of the annular bead 21 within pipe 13 snugly within and around the annular channel 23 in pipe 11 and to provide an effective annular seal therebetween throughout 360°. By contracting the ring there is further provided a mechanical interlock between the contracted ring and the other annular adjacent channel 19 formed within the outer pipe 13.

The ring is constructed preferably of steel, such as for example 1010-1020 steel, though not limited thereto, and initially is assembled over the pipes at their overlap 15 and thereafter contracted, swaged or otherwise reduced in diameter so as to provide the mechanical interlocks above described. For illustration, one method of contracting the ring for providing the mechanical interlock, would be to initially heat the ring to a substantially elevated temperature, possibly incandescent, so as to increase its internal diameter to facilitate its positioning over the pipe overlap and as the ring cools, it will contract to the relationship shown in FIG. 3 so as to form the annular grooves 19, 23 and the annular bead 21 to provide the mechanical interlock and seal between the pipes and the mechanical interlock between the ring and outer pipe.

While this method is less likely for reducing the diameter of the ring, the ring could otherwise be constricted, contracted or swedged or shrunk in some other manner using a swaging tool or a pair of closable die elements such as shown in 25 and 27, FIG. 6.

The present invention is directed to the clamp, as above described, the clamp combination with a pair of assembled engaging pipes as well as the method for contracting the ring body for accomplishing the mechanical interlock and seal between the assembled pipes.

In some situations, where it is absolutely necessary that there be a perfect seal between the outlet of a muffler and the exhaust pipe or other type of a vehicle, the pipes at their overlap have been welded together to assure such seal and a positive mechanical interlock. This is time consuming and costly.

The present invention contemplates a unit clamp which once shrunk onto the overlap portion of the parallel engaging pipes, is substantially permanently applied thereto and permanently interlocked with the outer pipe and with the respective pipes permanently and mechanically interlocked substantially.

A further result is that the connection once made will not loosen without the destruction of the respective connected pipes.

There are no nuts or fasteners to loosen up with the result that the ring body once assembled is for most purposes permanent for the life of the muffler or other parts assembled.

Figure 7:
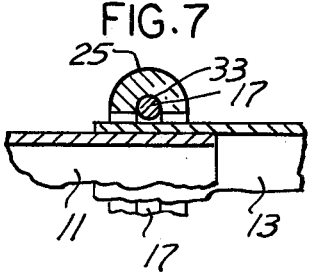
FIG. 7 is a fragmentary section taken in the direction of arrows 7—7 of FIG. 6.
Figure 8:
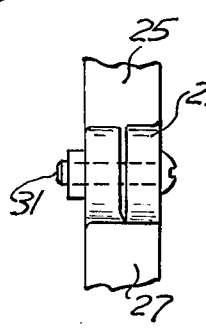
FIG. 8 is a fragmentary view taken in the direction of arrows 8—8 of FIG. 6.

In accordance with the present method, a further illustration of the apparatus for contracting ring body includes the opposed substantially semicircular dies 25 and 27 with the circular laterally displaced end portions 29 interconnected by the pivot pin or fastener 31. Each of the opposed die sections has formed therein a semi-circular channel 33, which is semi-circular in cross section and adapted to cooperatively receive the particular ring body 17 for assembly therebetween such as shown in FIG. 7. Each of the die halves includes on the end thereof opposite from the pivot ends 29 a pair of parallel spaced die anchors 35 and 37 having outwardly opening central slots 39.

In the illustrative embodiment, the die anchors are forcefully and compressively drawn together utilizing an eyebolt 41 nested within slot 39 of the upper anchor pivotally connected thereto by a transverse pin. In the use position of the dies engaging the ring body 17 throughout 360° with the eyebolt threaded shank extending downwardly within the corresponding slot 39 of the lower die anchor 37, the nut 43 is mechanically tightened using an power wrench or otherwise, in order to draw the die sections toward each other sufficiently so as to contact the ring body 17. At that time that ring body has already been assembled over the pipes at the overlap, such as shown in FIGS. 1, 2, 3, and 6.

For disengaging the die sections from the assembled interlocked and sealed pipes, the nut 43 is loosened and the eyebolt is swung outwardly such as shown by the arrow, so as to disengage the lower die anchor 37 after which the die sections may be opened up and removed from the assembled pipes.

It should be kept in mind that the use of the die halves 25 and 27 for contracting the ring body 17, the die halves must first be pivotally opened so as to position over the ring 17 which has already been positioned over their overlap 15. Thereafter, the eyebolt 41 in the upright position shown in FIG. 6, is mechanically or otherwise drawn up bringing the die elements towards each other and at the same time contracting the dimensions of the ring, particularly its interior dimension.

Having described my invention, reference should now be had to the following claims.

I claim:

1. The method of securing together and sealing at their annular overlap a pair of assembled pipes comprising:

assembling a ring body over said pipes at said overlap:

and mechanically swaging and compressing said ring body throughout its circumference reducing its internal diameter;

said swaging employing a compression die including a pair of opposed symmetrical semi-circular die halves pivotally connected together at their one ends;

each die half having a semi-circular die groove therein of semi-circular cross-section;

said die halves having a pair of spaced apart anchors;

said die halves being positionable around and receiving the ring body as assembled over said pipes;

and means interconnecting said anchors for mechanically drawing them together, reducing the internal diameter of said ring body.

2. In the method of claim 1, said anchors having outwardly opening aligned end slots therein;

said means including an eyebolt pivotally mounted upon one anchor within its slot;

and having a threaded shank extending through the slot of the other anchor;

and a nut threaded onto said eyebolt shank for compressive engaging registry with the adjacent anchor.

3. In the method of claim 2, said eyebolt adapted to swing out of engagement with the adjacent anchor on loosening of said nut for disassembling said die halves from said ring and interconnected pipes.

4. The method of securing together and sealing at their annular overlap a pair of assembled pipes comprising assembling a ring body over said pipes at said overlap;

and shrinking said ring body throughout its circumference reducing its internal diameter;

said ring forming concentric outer annular channels in said pipes and a corresponding inner annular bead in the outer pipe nested within the channel upon the inner pipe, providing an annular mechanical interlock and seal between said pipes throuhout 360° and an annular mechanical interlock between the ring body and the outer pipe;

the preliminary step of heating the ring substantially above room temperature and expanding its inner diameter to facilitate the assembly of the ring onto said pipes, the ring contracting at room temperature.

5. In the method of securing together and sealing at their annular overlap a pair of assembled pipes comprising;

assembling a ring body over said pipes at said overlap;

and mechanically swaging and compressing said ring body throughout its circumference reducing its internal diameter;

said swaging employing a compression die including a pair of opposed symmetrical semi-circular die halves;

each die half having a semi-circular die groove therein of uniform cross-section;

said die halves being positionable around and receiving the ring body as assembled over said pipes;

and means interconnecting said die halves mechanically drawing them together reducing the internal diameter of said ring body.

6. In the method of claim 5, said ring body being of endless solid metal and of circular cross-section.

7. In the method of claim 5, one of said pipes being a muffler outlet, the other of said pipes being selectively a catalytic coverter pipe, an exhaust pipe and tail pipe.

* * * * *